United States Patent
Magarill

(10) Patent No.: US 7,070,301 B2
(45) Date of Patent: Jul. 4, 2006

(54) SIDE REFLECTOR FOR ILLUMINATION USING LIGHT EMITTING DIODE

(75) Inventor: Simon Magarill, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 71 days.

(21) Appl. No.: 10/701,201

(22) Filed: Nov. 4, 2003

(65) Prior Publication Data

US 2005/0094401 A1    May 5, 2005

(51) Int. Cl.
*F21V 7/04* (2006.01)
(52) U.S. Cl. ............... 362/241; 362/247; 362/297; 362/341; 362/347; 362/800
(58) Field of Classification Search ........... 362/241, 362/247, 296, 341, 347, 800, 297, 545
See application file for complete search history.

(56) References Cited

U.S. PATENT DOCUMENTS

| | | |
|---|---|---|
| 1,428,662 A | 9/1922 | Walter |
| 1,451,893 A | 4/1923 | Walter |
| 2,587,956 A | 3/1952 | Roy |
| 3,756,688 A | 9/1973 | Hudson et al. |
| 3,984,178 A | 10/1976 | Bergqvist |
| 4,915,489 A | 4/1990 | Minko |
| 5,055,892 A | 10/1991 | Gardner et al. |
| 5,285,318 A | 2/1994 | Gleckman |
| 5,398,086 A | 3/1995 | Nakano |
| 5,428,365 A | 6/1995 | Harris |
| 5,442,414 A | 8/1995 | Janssen |
| 5,557,353 A | 9/1996 | Stahl |
| 5,592,188 A | 1/1997 | Doherty |
| 5,625,738 A | 4/1997 | Magarill |
| 5,633,737 A | 5/1997 | Tanaka |
| 5,719,706 A | 2/1998 | Masumoto |
| 5,757,341 A | 5/1998 | Clarke |
| 5,764,319 A | 6/1998 | NIshihara |
| 5,782,553 A * | 7/1998 | McDermott ............... 362/245 |
| 5,796,526 A | 8/1998 | Anderson |
| 5,839,823 A | 11/1998 | Hou |
| 5,863,125 A | 1/1999 | Doany |
| 5,900,981 A | 5/1999 | Oren |
| 5,969,872 A | 10/1999 | Oren |

(Continued)

FOREIGN PATENT DOCUMENTS

EP    0 083 527    7/1983

(Continued)

OTHER PUBLICATIONS

Lumileds Lighting, U.S., LLC, "Power Light Source Luxeon™ Emitter", Document# DW25 (Jul. 25, 2003) pp. 1-12.

(Continued)

*Primary Examiner*—Sandra O'Shea
*Assistant Examiner*—James W Cranson, Jr.
(74) *Attorney, Agent, or Firm*—George W. Jonas

(57) ABSTRACT

An LED illumination unit uses a first reflector comprising a reflecting surface formed as a surface of revolution about a first revolution axis. The LED emits light about a first LED axis towards the reflecting surface of the first reflector. The first LED axis is non-parallel to the first revolution axis and the light emitting area of the first LED unit is positioned substantially at a focus of the reflecting surface. The reflector may also have two or more reflecting surfaces for collecting and directing light from two or more respective LEDs.

56 Claims, 13 Drawing Sheets

U.S. PATENT DOCUMENTS

| | | | |
|---|---|---|---|
| 5,971,545 A | 10/1999 | Haitz | |
| 5,987,793 A | 11/1999 | Ebine | |
| 5,997,150 A | 12/1999 | Anderson | |
| 6,028,694 A | 2/2000 | Schmidt | |
| 6,038,005 A | 3/2000 | Handschy | |
| 6,061,183 A | 5/2000 | Nakai | |
| 6,102,552 A | 8/2000 | Tullis | |
| 6,104,458 A | 8/2000 | Fukuda | |
| 6,104,541 A | 8/2000 | Otomo | |
| 6,139,156 A | 10/2000 | Okamori et al. | |
| 6,144,426 A | 11/2000 | Yamazaki | |
| 6,177,761 B1 | 1/2001 | Pelka | |
| 6,196,699 B1 | 3/2001 | Stanton | |
| 6,201,629 B1 | 3/2001 | McClelland | |
| 6,224,216 B1 | 5/2001 | Parker | |
| 6,227,669 B1 | 5/2001 | Tiao et al. | |
| 6,236,512 B1 | 5/2001 | Nakai | |
| 6,252,636 B1 | 6/2001 | Bartlett | |
| 6,254,237 B1 | 7/2001 | Booth | |
| 6,280,058 B1 | 8/2001 | Horigome | |
| 6,318,863 B1 | 11/2001 | Tio et al. | |
| 6,300,039 B1 | 12/2001 | Matsui | |
| 6,332,688 B1 | 12/2001 | Magarill | |
| 6,336,724 B1 | 1/2002 | Shoui et al. | |
| 6,341,867 B1 | 1/2002 | Itoh | |
| 6,398,389 B1 | 6/2002 | Bohler et al. | |
| 6,402,347 B1 | 6/2002 | Maas | |
| 6,412,953 B1 | 7/2002 | Tiao et al. | |
| 6,419,365 B1 | 7/2002 | Potekev et al. | |
| 6,459,835 B1 | 10/2002 | Nagaoka et al. | |
| 6,469,755 B1 | 10/2002 | Adachi | |
| 6,471,358 B1 | 10/2002 | Itoh et al. | |
| 6,483,196 B1 | 11/2002 | Wojnarowski | |
| 6,491,443 B1 | 12/2002 | Serizawa | |
| 6,499,863 B1 | 12/2002 | Dewald | |
| 6,505,939 B1 | 1/2003 | Bierhuizen et al. | |
| 6,527,419 B1 | 3/2003 | Galli | |
| 6,547,400 B1 | 4/2003 | Yokoyama | |
| 6,547,423 B1 | 4/2003 | Marshall | |
| 6,561,654 B1 | 5/2003 | Mukawa et al. | |
| 6,570,190 B1 | 5/2003 | Krames | |
| 6,591,037 B1 | 7/2003 | Yonekubo | |
| 6,623,122 B1 | 9/2003 | Yamazaki et al. | |
| 6,639,572 B1 | 10/2003 | Little | |
| 6,644,814 B1 | 11/2003 | Ogawa | |
| 6,646,806 B1 | 11/2003 | Bierhuizen | |
| 6,657,236 B1 | 12/2003 | Thibeault | |
| 6,672,724 B1 | 1/2004 | Peterson et al. | |
| 6,688,747 B1 | 2/2004 | Wichner et al. | |
| 6,726,329 B1 | 4/2004 | Li et al. | |
| 6,733,139 B1 | 5/2004 | Childers et al. | |
| 6,595,648 B1 | 7/2004 | Woodgate et al. | |
| 6,788,471 B1 | 9/2004 | Wagner | |
| 6,843,566 B1 | 1/2005 | Mihara | |
| 2001/0022613 A1 | 9/2001 | Matsui | |
| 2001/0046131 A1 | 11/2001 | Hoelen | |
| 2001/0048493 A1 | 12/2001 | Swanson | |
| 2001/0048560 A1 | 12/2001 | Sugano | |
| 2002/0003636 A1 | 1/2002 | Conner | |
| 2002/0003669 A1 | 1/2002 | Kedar et al. | |
| 2002/0093743 A1 | 7/2002 | Miyamae | |
| 2002/0097000 A1 | 7/2002 | Muthu | |
| 2002/0105807 A1* | 8/2002 | Loughrey | 362/278 |
| 2002/0114157 A1 | 8/2002 | Fu-Ming et al. | |
| 2002/0145708 A1 | 10/2002 | Childers et al. | |
| 2002/0154277 A1 | 10/2002 | Mukawa et al. | |
| 2002/0159036 A1 | 10/2002 | Yamagishi | |
| 2002/0186350 A1 | 12/2002 | Peterson | |
| 2002/0191395 A1* | 12/2002 | Fleury | 362/236 |
| 2003/0016539 A1 | 1/2003 | Minano | |
| 2003/0043582 A1 | 3/2003 | Chan | |
| 2003/0133080 A1 | 7/2003 | Ogawa | |
| 2003/0147055 A1 | 8/2003 | Yokoyama | |
| 2003/0193649 A1 | 10/2003 | Seki | |
| 2003/0214815 A1 | 11/2003 | Ishida et al. | |
| 2004/0004176 A1 | 1/2004 | Liang | |
| 2004/0042212 A1 | 3/2004 | Du et al. | |
| 2004/0062044 A1 | 4/2004 | Kazunari | |
| 2004/0062045 A1 | 4/2004 | Chang | |
| 2004/0080938 A1 | 4/2004 | Holman et al. | |
| 2004/0174501 A1 | 9/2004 | Slobodin et al. | |
| 2004/0202007 A1* | 10/2004 | Yagi et al. | 362/545 |
| 2004/0207816 A1 | 10/2004 | Manabu et al. | |
| 2005/0094401 A1 | 5/2005 | Magarill | |
| 2005/0134811 A1 | 6/2005 | Magarill | |
| 2005/0174768 A1 | 8/2005 | Conner | |
| 2005/0174771 A1 | 8/2005 | Conner | |
| 2005/0174775 A1 | 8/2005 | Conner | |

FOREIGN PATENT DOCUMENTS

| | | |
|---|---|---|
| EP | 0 322 070 | 6/1989 |
| EP | 0 493 800 | 7/1992 |
| EP | 0 587 371 | 3/1994 |
| EP | 0 740 178 | 10/1996 |
| EP | 0 795 771 | 9/1997 |
| EP | 0 837 350 | 4/1998 |
| EP | 0 881 514 | 12/1998 |
| EP | 1 003 064 | 5/2000 |
| EP | 1 052 856 | 11/2000 |
| EP | 1 347 653 | 9/2003 |
| EP | 1 357 333 A | 10/2003 |
| EP | 1 363 460 | 11/2003 |
| EP | 1 398 659 | 3/2004 |
| GB | 1 195 547 A | 6/1970 |
| JP | 09-018072 | 1/1997 |
| JP | 10-123512 | 5/1998 |
| JP | 11-231316 | 8/1999 |
| JP | 2000-305040 | 11/2000 |
| JP | 2002-133932 | 5/2002 |
| JP | 2002-184206 | 6/2002 |
| JP | 2002177218 A | 6/2002 |
| JP | 2003-330109 | 11/2003 |
| JP | 2005-128236 | 5/2005 |
| TW | 531 662 B | 5/2003 |
| WO | WO 2002/065184 | 8/2002 |
| WO | WO 2003/56876 | 7/2003 |
| WO | WO 2004/043076 | 5/2004 |
| WO | WO 2004/107751 | 12/2004 |
| WO | WO 2004/109366 | 12/2004 |

OTHER PUBLICATIONS

Smith, Warren J. "Modern Optical Engineering The Design of Optical Systems", McGraw-Hill Third Edition, (2000) pp. 245-247, 470-474.

Stupp, Edward H. and Brennesholtz, Matthew S. "Projection Displays" Modeling Lumen Throughput "Etendue at a flat surface" John Wiley & Sons, Inc. III Series (1999) p. 244-245.

Light Emitting Diodes 2003, Oct. 15-17, 2002, "Optical Design for LED Based Devices" Juan Manuel Teijido, Sony International (Europe) GmbH, Sony Corporate Laboratories Europe.

Jacobson, et al., "Novel Compact Non-Imaging Collectors for LED Arrays", Illumitech, Inc., bjacobson@illumitech.com.

Secondary Optics Design Considerations for SuperFlux LEDs, application brief AB20-5, Appendix 5A, pp. 5-22.

Steve Paolini, Gerard Harbers, Matthijs Keuper, Lumileds, Light from Silicon Valley, High-Power LED Illuminators in Projection Displays, pp. 1-19.

Gerard Harbers, Wim Timmers, Willem Sillevis-Smitt, LED Backlighting for LCD HDTV, Journal of the SID, Oct. 4, 2002, pp. 347-350.

LumiBright Light Engine, Innovations in Optics, Inc, Woburn, Massachusetts.

Laikin, Milton, "Lens Design-Third Edition, Revised and Expanded", Table of Contents, pp. 305-312, Marcel Dekker, New York, 2001.

Melles Griot: "Specifying Laser Diode Optics" Online! 2000, 2002 XP002323875, Section "Focusing Lenses For Fiber Optics" Lines 19-23, Figures 3, 4.

* cited by examiner

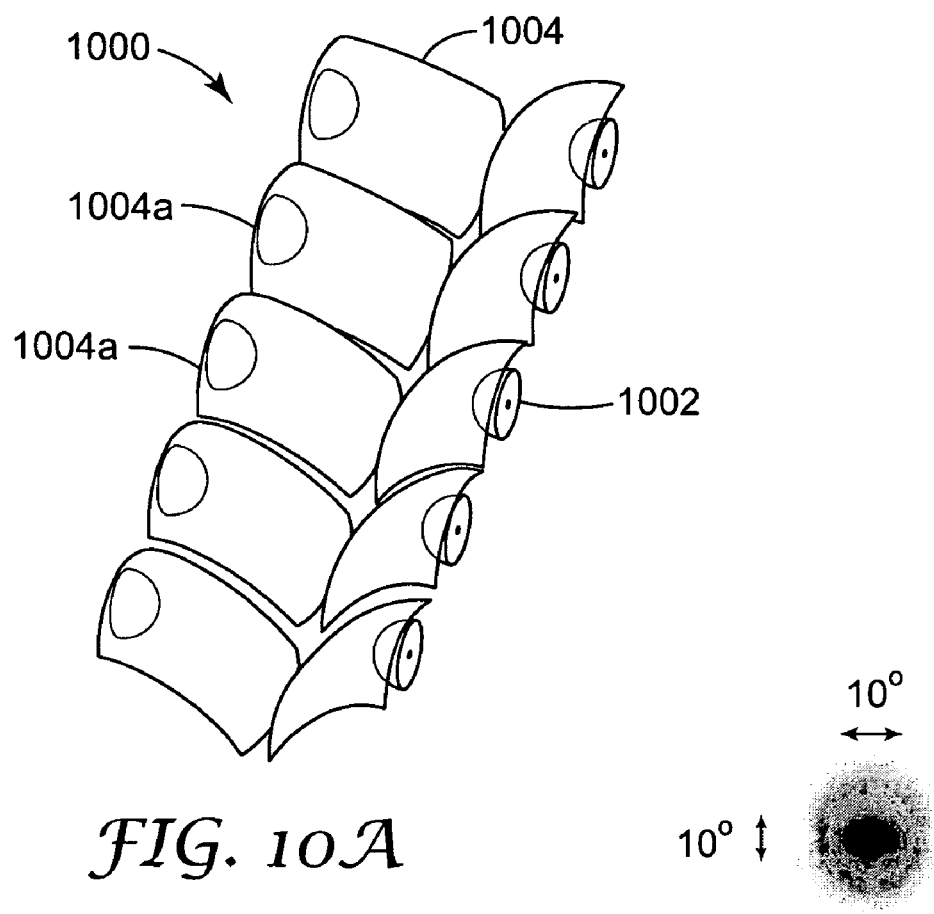
FIG. 10A
FIG. 10B
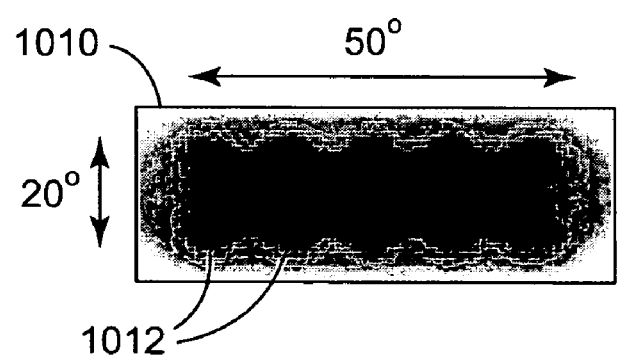
FIG. 10C

SIDE REFLECTOR FOR ILLUMINATION USING LIGHT EMITTING DIODE

FIELD OF THE INVENTION

The invention relates to optical systems, and more particularly to a reflector system for collecting light from one or more light emitting diodes.

BACKGROUND

Light emitting diodes (LEDs) are devices that emit light from a semiconductor junction. The light is emitted from an LED over a wide range of angles via the combination of carriers at the junction: the large emission angle for the LED light makes it more difficult to collect and direct the light for illuminating optical devices. On the other hand, the small size, long life and high optical efficiency, typically in excess of 50% of electrical energy converted to optical energy, make the LED attractive as a light source for illuminating optical devices, such as displays, projection systems and the like. There is a need, therefore, for an approach to collecting and directing LED light with high efficiency while maintaining small size and low cost.

SUMMARY OF THE INVENTION

One particular embodiment of the invention is directed to an illumination unit that has a first reflector comprising a reflecting surface formed as a surface of revolution about a first revolution axis. A first light emitting diode (LED) unit has a light emitting area emitting light about a first LED axis to the reflecting surface. The first LED axis is non-parallel to the first revolution axis and the light emitting area of the first LED unit is positioned substantially at a focus of the reflecting surface.

Another embodiment of the invention is directed to a reflector unit for reflecting illumination light. The reflector unit has a reflector body having a body axis. The reflector body comprises a first reflecting surface conforming to a first surface of revolution about a first revolution axis and a second reflecting surface formed integrally with the first reflecting surface. The second reflecting surface conforms to a second surface of revolution about a second revolution axis. The first and second reflecting surfaces are positioned transversally about the body axis.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 10A schematically shows a perspective view of an illumination unit that includes multiple paraboloidal side reflectors according to principles of the present invention;

FIGS. 10B and 10C present calculated radiation patterns that are emitted from different embodiments of the illumination unit of FIG. 10A;

Figure 1C:
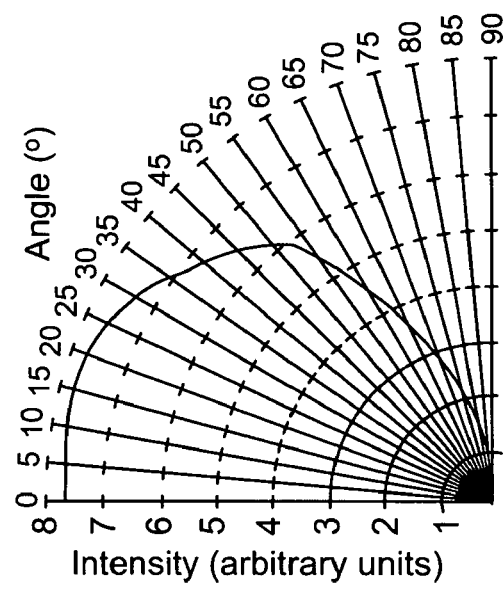
FIGS. 1B and 1C present Cartesian and polar graphs respectively showing radiation patterns for the LED unit illustrated in FIG. 1A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is more particularly applicable to light collection and management systems useful for illuminating a target with light from one or more light emitting diodes (LEDs).

LEDs with higher output power are becoming more available, which opens up new applications for LED illumination. Some applications that may be addressed with high power LEDs include their use as light sources in projection and display systems, as illumination sources in machine vision systems and camera/video applications, and even in distance illumination systems such as car headlights.

LEDs typically emit light over a wide angle, and one of the challenges for the optical designer is to efficiently collect the light produced by an LED and direct the light to a selected target area. Another challenge is to package the LEDs effectively. This requires includes collecting of light from an assembly having multiple LEDs and directing the collected light to a given target area within a given acceptance cone. Furthermore, it is important that the light collection and direction system be capable of being produced in a small package.

Figure 1A:
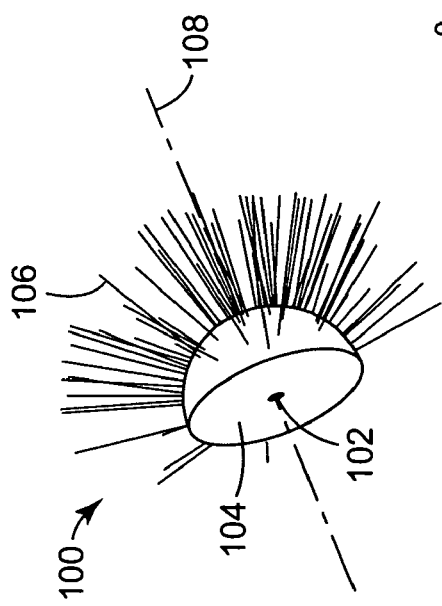
FIG. 1A schematically illustrates a LED unit emitting light.
Figure 1B:
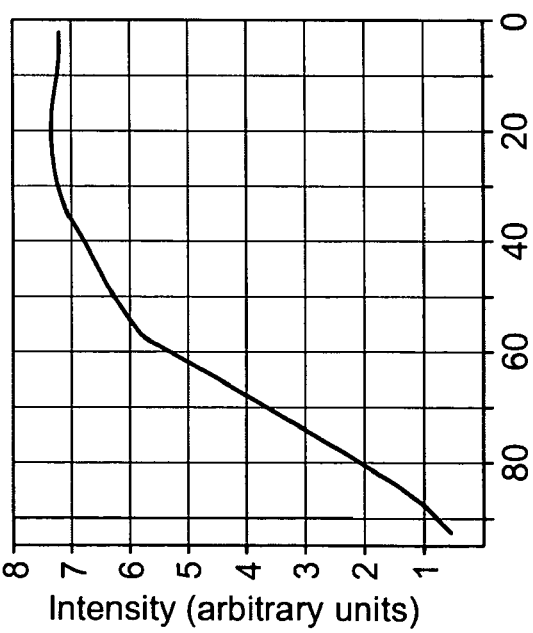

An example of an LED unit 100 is now described with reference to FIGS. 1A–1C. The LED unit 100 includes an LED emitter area 102, typically formed from a semiconductor diode device on a substrate. LEDs are commonly encapsulated within an optically transmissive body that operates as a lens 104. One common lens shape for high power LEDs is a half-ball lens, with the emitter positioned at the center of the ball lens, as illustrated. Light 106 is emitted over a wide range of angles. The radiation pattern from a typical LED unit is shown in Cartesian co-ordinates in FIG. 1B and in polar co-ordinates in FIG. 1C. The radiation pattern is close to being Lambertian. The emission from the LED emitter 102 is typically symmetrical about the LED axis 108, corresponding to emission at 0°. In many LEDs, the emitter area 102 is flat, so the LED axis is perpendicular to the flat emitter area 102. Where the radiation pattern is not symmetrical, the LED axis 108 corresponds to the average direction along which light is emitted from the emitter area 102. In the example illustrated in FIGS. 1B and 1C, the half angle of the intensity of light emitted by the LED, which is that angle at which the intensity has fallen off to one half of the maximum value, is about 65°.

Figure 2A:
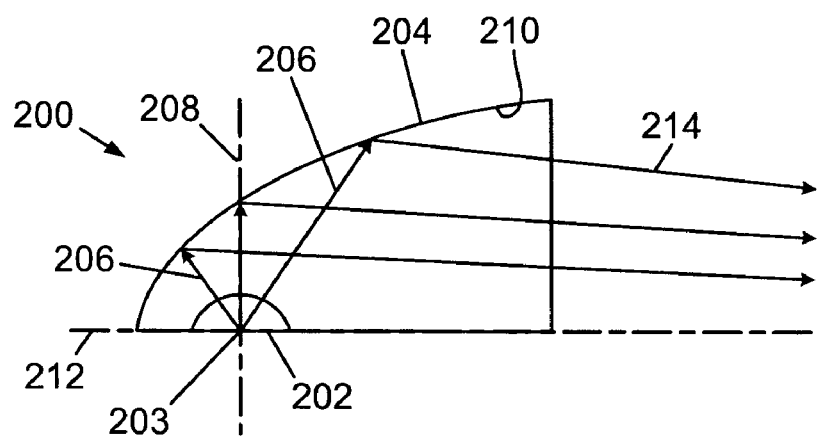
FIGS. 2A–2C show schematic cross-sectional and perspective views of an embodiment of an illumination unit that includes a side reflector according to principles of the present invention.
Figure 2B:
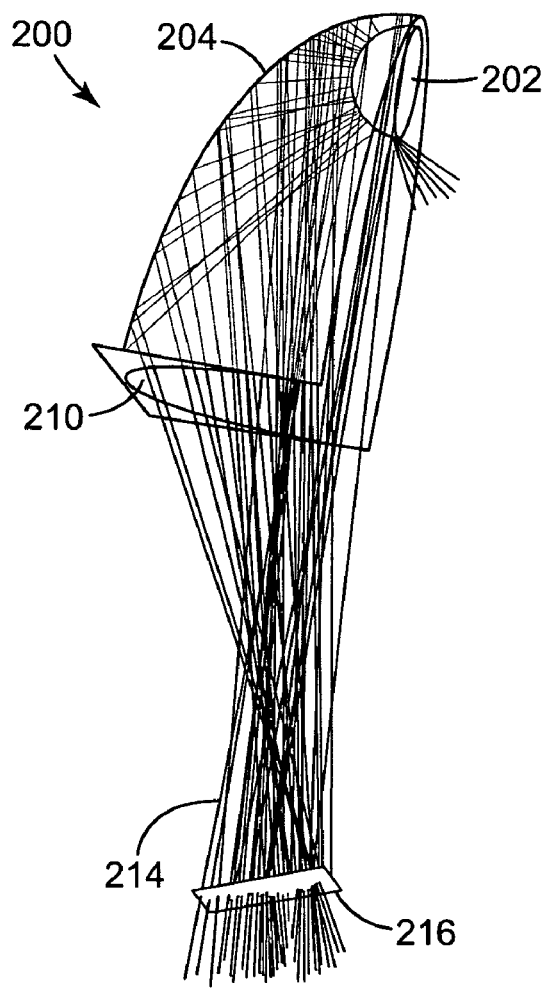
Figure 2C:
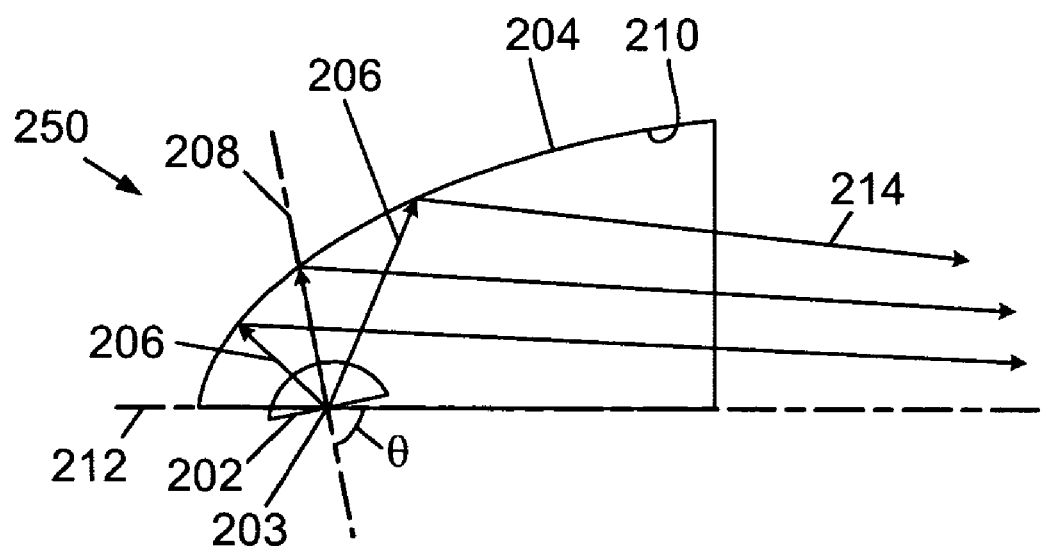

One approach to collecting and directing the light emitted by an LED unit is now discussed with respect to an illumination unit 200 schematically illustrated in FIGS. 2A–2C. Light 206 is emitted by an LED unit 202 having an LED emitter area 203, and is reflected by a reflector 204. The LED unit 202 has an LED axis 208. The reflector 204 has a reflecting surface 210 whose shape conforms to at least a part of a surface of revolution about the reflector revolution axis 212. The reflecting surface 210 may, for example, conform to an ellipsoidal or a paraboloidal surface, or to some other type of surface of revolution. The light emitter area 203 is positioned close to, or at, a focus of the surface of revolution, on the revolution axis 212. It should be understood in the present description that when a reflecting surface is described as conforming to a surface of revolution, there is no implication that the reflecting surface must comprise an entire revolution. When a reflecting surface is described as conforming to a surface of revolution, the reflecting surface is intended to conform to at least a part of a surface of revolution, that need not require an entire revolution.

The LED axis 208 is not parallel to the revolution axis 212. For example, the illumination unit 250 schematically illustrated in FIG. 2C has an angle, θ, between the LED axis 208 and the revolution axis 212. The angle, θ, is the minimum angle between the LED axis 208 and the revolution axis 212. Typically, the value of θ is in the range $45° \leq \theta \leq 90°$, and may be in the range $60° \leq \theta \leq 90°$. The LED axis 208 and revolution axis 212 may also be approximately perpendicular, where the angle θ has a value of around 90°, as is illustrated in FIG. 2A. The reflected light 214 may be generally converging towards the axis 212, parallel to the axis 212 or may be diverging away from the axis 212.

The reflector surface 210 may be formed of any suitable reflective material for reflecting light at the wavelength of light emitted by the LED unit 202. The reflector surface may be, for example, formed by multiple polymer layers whose thicknesses are selected to increase the reflectivity of the reflector surface 210. In another example, the reflector surface may be metalized, or may be coated with inorganic dielectric coatings.

A perspective view of the illumination unit 200 is schematically shown in FIG. 2B. In the illustrated embodiment, the reflecting surface 210 conforms to an ellipsoidal surface. The light 214 is directed by the reflecting surface to the target area 216. The LED unit 202 may be placed with the emitter 203 at one focus of the ellipsoidal surface. The reflected light 214 is, therefore, generally directed to the second focus of the ellipsoid. The target area 216 may be placed at the second focus of the ellipsoid. The target area is 216 any area that is desired to be illuminated with light from the LED unit 202. For example, where the illumination unit is being used to illuminate a projection system, the target area may be the input aperture to a tunnel integrator or some other device for homogenizing the light. It will be appreciated that optical aberrations may be present, and so the reflected light may not be brought to an exact focus at the second focus of the ellipsoid, even if the emitting area is positioned exactly at the first focus.

Figure 3A:
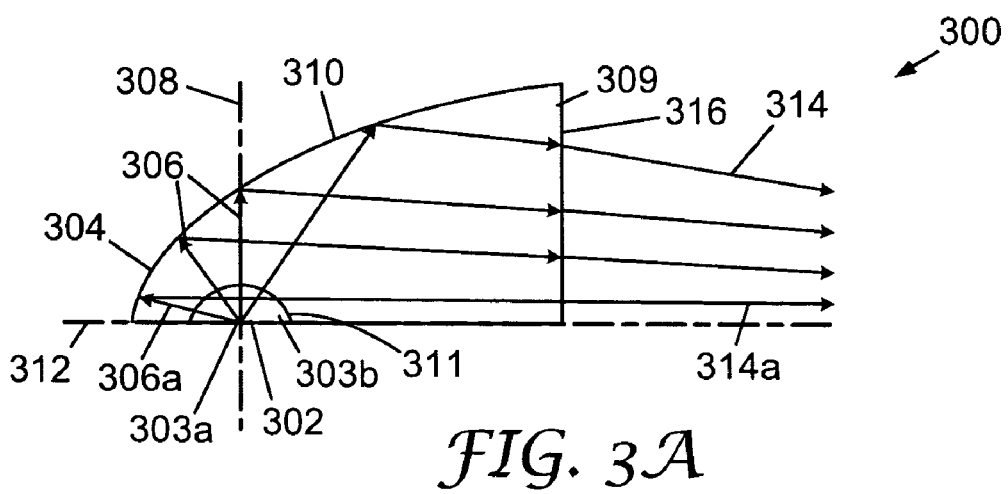
FIGS. 3A–3C show schematic cross-sectional views of embodiments of illumination units that include solid side reflectors according to principles of the present invention.
Figure 3B:
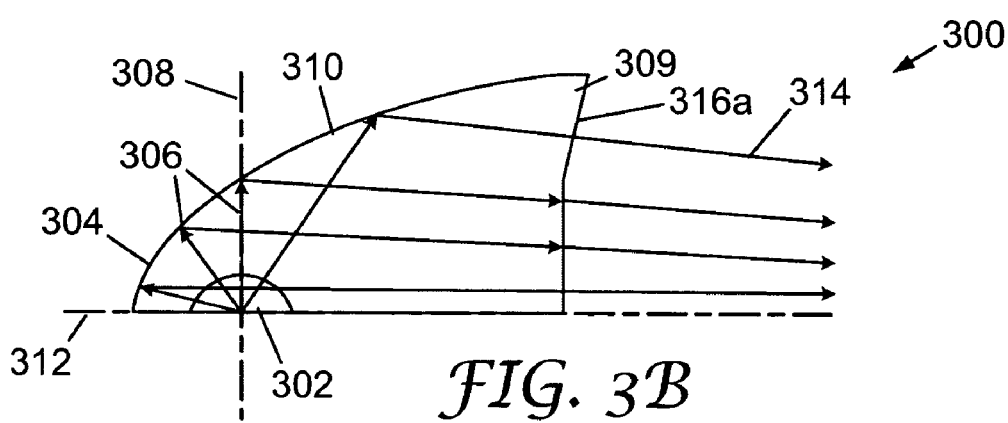
Figure 3C:
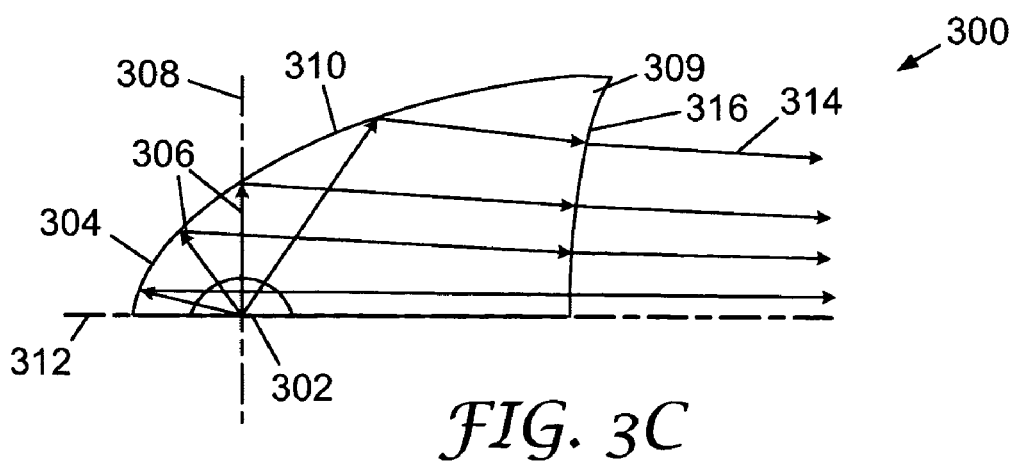

The reflector may be hollow, as illustrated in FIGS. 2A–2C, or may be solid, for example as is now discussed with reference to FIGS. 3A–3C. An illumination unit 300 includes an LED unit 302 with an emitter 303a substantially at the focus of the reflector 304. The LED axis 308 is perpendicular, or close to being perpendicular, to the reflector revolution axis 312.

The reflector 304 includes a solid, transparent body 309 and a reflecting surface 310. The solid body 309 may be formed from any suitable transparent material, for example, from a molded polymer such as polycarbonate, cyclic olefin copolymers (COC), such as copolymers of ethylene and norbornene, polymethyl methacrylate (PMMA), or the like. Light 306 from the LED unit 302 is reflected at the reflecting surface 310 and the reflected light 314 passes through the exit surface 316 of the body 309. The reflecting surface 310 may use any suitable type of reflecting material for reflecting the light. For example, the reflecting surface 310 may be metalized or may use a multiple layer dielectric reflector. A multiple layer dielectric reflector may be formed using multiple layers of inorganic layers, or may be formed from a stack of polymer layers having alternating refractive indices.

The transparent body 309 may be provided with a concave surface 311 concentric to the location of the LED emitting area 303a and LED unit 302 may be secured in this concave surface, for example using optical cement. This is convenient since the interface between the half-ball lens of the LED unit 302 and the transparent body 309 is index matched, at least partially, thus reducing refractive effects and reducing reflective losses.

The solid body reflector 304 performs differently from a hollow reflector. One difference is described with reference to light ray 306a, emitted from the LED unit 302 in a direction close to being parallel with the revolution axis 312. Light ray 306a is reflected as light ray 314a. The refractive power of the lens 303b is less than the case where the lens is in air, because the lens 303b is surrounded by the material of the transparent body 309. Accordingly, light ray 314a may pass through the lens 303b to the exit surface 316 of the body 309. In the case of a hollow reflector, there is no refractive index matching at the lens, since the lens is typically sitting in air, and so the lens refracts reflected ray 314a into a direction away from the target area. Accordingly, there may be an increase in the amount of light reaching the target area when a solid body reflector 304 is used.

Another difference between a solid body reflector and a hollow reflector is that the exit surface 316 of the solid body 309 provides a refracting surface that may be used to control direction of the reflected light 314. This gives the designer another degree of freedom to control the direction of the light exiting from the illumination unit 300. In the embodiment illustrated in FIG. 3A, the exit surface 316 is flat and is substantially perpendicular to the revolution axis 312. It will be appreciated that a flat exit surface 316 need not be perpendicular to the revolution axis 312 and that the angle between the exit surface 316 and the revolution axis 312 may have some angle other than 90°, The exit surface 316 need not be flat. The exit surface may be faceted, for example as illustrated in FIG. 3B. The faceted exit surface 316*a* may include two or more facets so as to refract different reflected rays 314 in different directions. The exit surface may also be curved, for example as illustrated in FIG. 3C. The curved exit surface 316*b* acts as a lens and may act as a positive lens so as to add focusing power to the focusing power of the reflecting surface 310, or may act as a negative lens so as to subtract focusing power from the focusing power of the reflecting surface. It will be appreciated that exit surface need not be curved over its entire area, and that the exit surface may have a portion that is flat and a portion that is curved. Furthermore, different portions of the exit surface may be provided with different curves so that the different portions of the exit surface have different focusing powers.

Figure 4C:
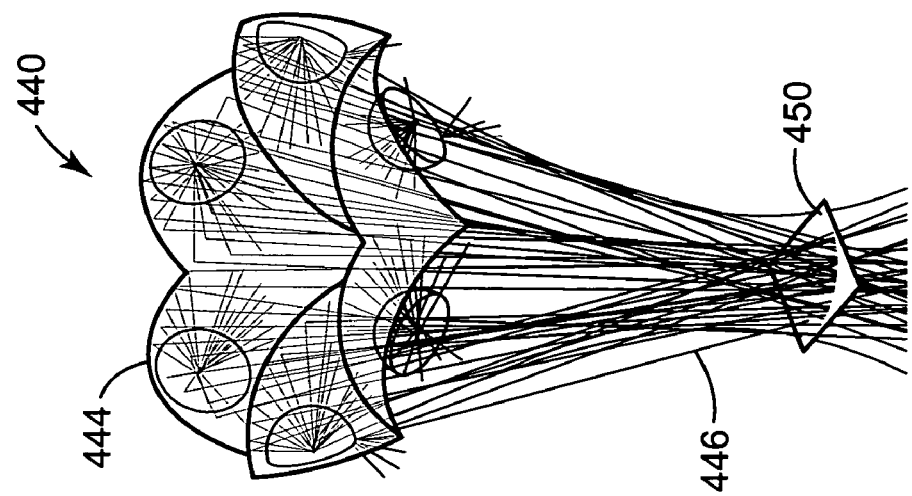
FIG. 4C shows a schematic view of an embodiments of an illumination unit that includes multiple side reflectors according to principles of the present invention.

A number of reflectors and respective LED units may be packaged together so as to increase the amount of light emitted from the illumination unit. One design criterion that is often important when packaging a number of light sources together is to reduce the overall size of the multi-source package while maintaining high efficiency of illumination into a particular cone angle. The side-illuminated reflector of the present invention provides some flexibility in reducing the package size while maintaining high light collection into a desired cone angle, as is now described with reference to FIGS. 4A–4C. FIG. 4A schematically shows an illumination unit 400 having a single reflector 404, with rays traced from the LED unit to the target area 410. The reflector 404 is shown to be semi-transparent so as to permit the viewer to see the traced rays 406. The reflector 404 is shown as a one-quarter ellipsoid. Since the LED unit maximally emits light in a direction approximately on the LED axis, those portions 404*a* of the reflector, farthest from the plane formed by the LED axis and the reflector axis and close to the bottom edge 408 of the reflector 404, reflect less light than those portions 404*c* close to the LED axis. Also, the portion 404*b* of the reflector that is close to the plane formed by the LED axis and reflector axis, but is furthest from the LED axis reflects less light than portions 404*c* close to the LED axis.

Figure 4B:
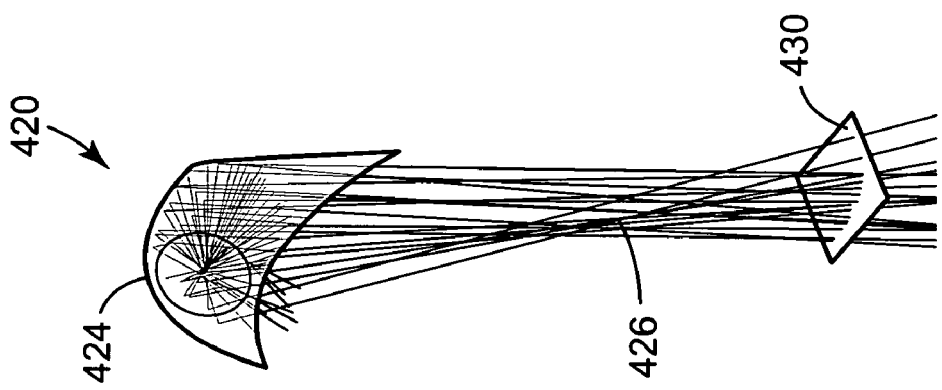
FIGS. 4A and 4B show schematic views of embodiments of illumination units that include side reflectors according to principles of the present invention.
Figure 4A:
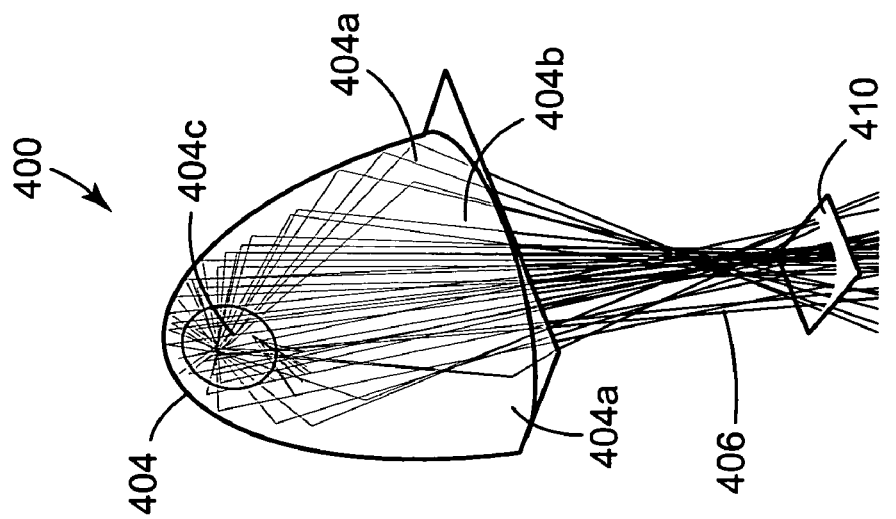

FIG. 4B schematically illustrates an illumination unit 420 in which the reflector 424 is formed like reflector 404 but with portions 404*a* and 404*b* removed. This illuminates the target area 430 with less light 426 than the version illustrated in FIG. 4A, and so the total reflection efficiency for the reflector 424 is less. However, since portions 404*a* and 404*b* are removed, multiple reflectors may be assembled together so as to illuminate the target with light within a desired cone angle, which increases the amount of light delivered to the target. FIG. 4C schematically illustrates an example of a multiple reflector illumination unit 440, having a reflector body 444 formed from six reflectors like reflector 424. The reflector body 444 may be formed in different ways, for example by assembling separate reflectors like reflector 424, or may be formed as an integrated unit. Significantly more light 446 is incident on the target area 450 than is incident on target areas 410 or 430, although the amount of light incident on the target area 450 may not be as much as six times that incident on the target area 410. Some calculated illumination efficiencies are discussed below with respect to some specific examples.

Figure 5:
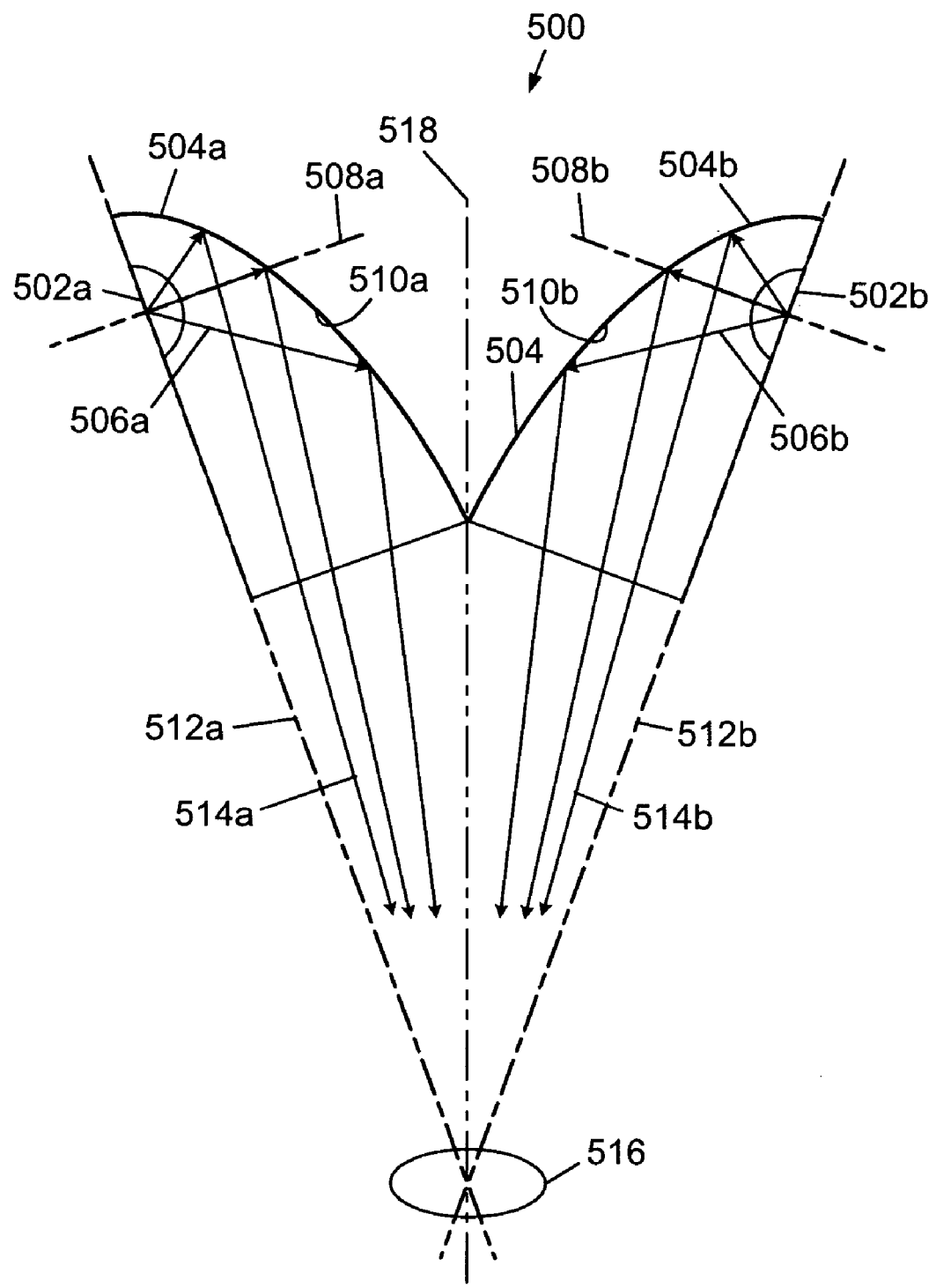
FIG. 5 schematically illustrates a cross-sectional view of an illumination unit that includes multiple side reflectors according to principles of the present invention.

A cross-section through a multiple-reflector illumination unit 500 is schematically presented in FIG. 5. The illumination unit 500 has a reflector body 504 formed from two reflectors 504*a* and 504*b* with respective illumination LED units 502*a* and 502*b*. Each reflector 504*a* and 504*b* is formed with a reflecting surface 510*a* and 510*b* that conforms to a surface of revolution about its respective revolution axis 512*a* and 512*b*. The reflectors 504*a* and 504*b* may be, for example, ellipsoidal, paraboloidal, or some other shape. The respective LED units 502*a* and 502*b* transmit light 506*a* and 506*b* to the reflector 504*a* and 504*b*, which reflects the light 514*a* and 514*b*. The LED units 502*a* and 502*b* have respective LED axes 508*a* and 508*b* non-parallel to their respective revolution axes 512*a* and 512*b*. In the illustrated embodiment, the LED axes 508*a* and 508*b* are substantially perpendicular to their respective revolution axes 512*a* and 512*b*.

In the illustrated embodiment, the reflecting surfaces 510*a* and 510*b* are ellipsoidal, so that the reflected light 514*a* and 514*b* is mostly converged. In addition, the axes 512*a* and 512*b* are not parallel to teach other, so the reflected light 514*a* and 514*b* from each reflector 504*a* and 504*b* propagates in such directions so as to overlap. In the illustrated embodiment, the axes 512*a* and 512*b* intersect at a position proximate the target area 516, so that the light 514*a* and 514*b* from each reflector 504*a* and 504*b* illuminates the target area 516. The reflector body 504 defines an axis 518 about which the reflectors 504*a* and 504*b* may be symmetrically placed. In the illustrated embodiment, the axes 512*a* and 512*b* intersect with the body axis 518 at the same intersection point and form the same angle to the body axis 518, although this need not be the case.

Figure 6C:
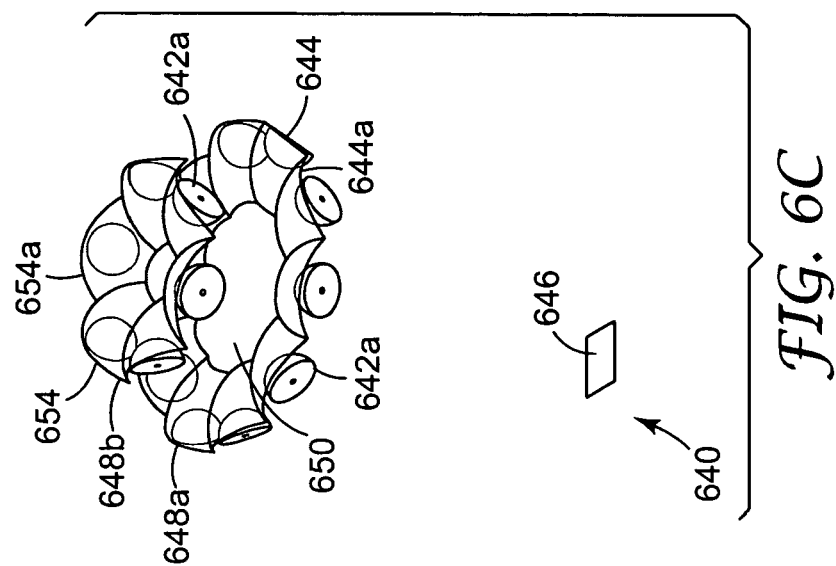
FIGS. 6A–6B schematically illustrate illumination units that include different numbers of side reflectors according to principles of the present invention.
Figure 6B:
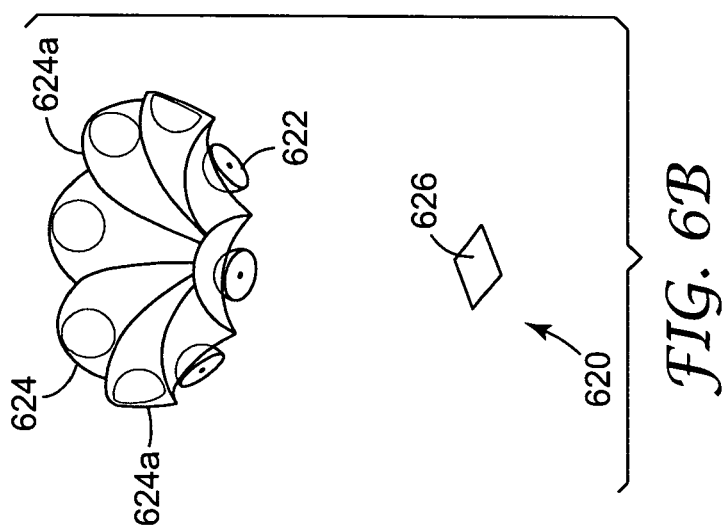
Figure 6A:
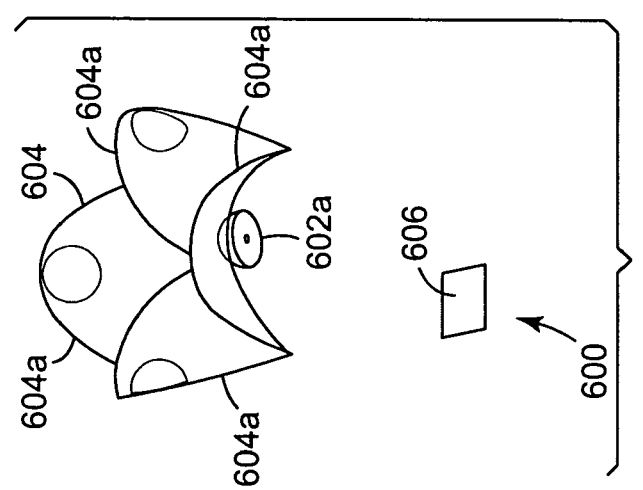

It will be appreciated that the reflector body may include different numbers of reflectors. Some examples are schematically illustrated in FIGS. 6A–6C. In FIG. 6A, the illumination unit 600 has a reflector body 604 formed from four reflectors 604*a*. Respective LED units 602 transmit light to the reflectors 604*a* for focusing to the target area 606. In FIG. 6B, the illumination unit 620 has a reflector body 624 formed from eight reflectors 624*a*. Respective LED units 622 transmit light to the reflectors 624*a* for focusing to the target area 626.

An illumination unit 640 is schematically illustrated in FIG. 6C, in which there are two tiers 648*a* and 648*b* of reflectors 644*a*. The first tier 648*a* is formed of a reflector body 644 having ten reflectors 644*a* disposed around an aperture 650. Respective LED units 642*a* produce light that is reflected by the reflectors 644*a* of the first tier 648 towards the target area 646. The second tier 648*b* is formed of a reflector body 654 having six reflectors 654*a* positioned together so as to direct light from respective LED units 642*a* through the aperture 648 towards the target area 646. It will be appreciated that the reflectors 644*a* of the first tier 648 may or may not be the same shape as the reflectors 654*a* of the second tier.

Figure 7B:
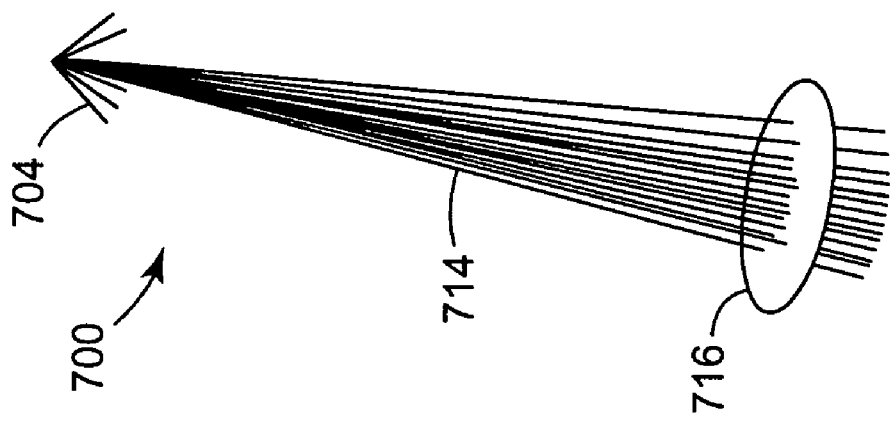
FIGS. 7A and 7B schematically illustrate another embodiment of an illumination unit according to principles of the present invention.
Figure 7A:
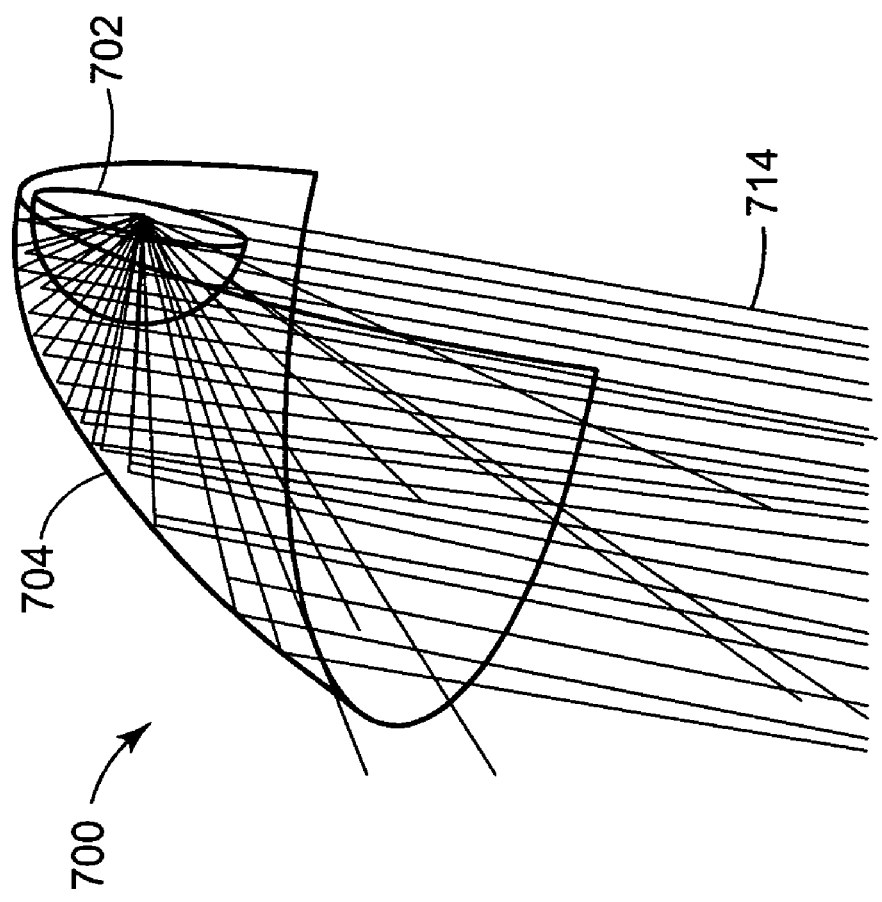

The reflector need not direct converging light towards the target area, but may be used to direct generally collimated light towards the target area or to direct diverging light towards the target area. This may be achieved using, for example an ellipsoidal reflector with the LED unit disposed at a position other than the focus of the ellipsoid. This may also be achieved using a reflecting surface that has a shape other than ellipsoidal. One example of such a shape is a paraboloidal shape. This is schematically illustrated in FIGS. 7A and 7B, where an illumination unit 700 includes a LED unit 702 that directs light to a paraboloidal reflector 704: the reflected light 714 is somewhat diverged towards the target area 716. In a specific example, the LED unit 702 has an emitting area of 0.5 mm×0.5 mm and emits light with a radiation pattern like that shown in FIGS. 1B and 1C. About 73% of the reflected light 714 is contained within a cone with a half angle of 5°. The illumination unit 700 may be made to have a small footprint, for example 24 mm×12 mm×12 mm.

Figure 8A:
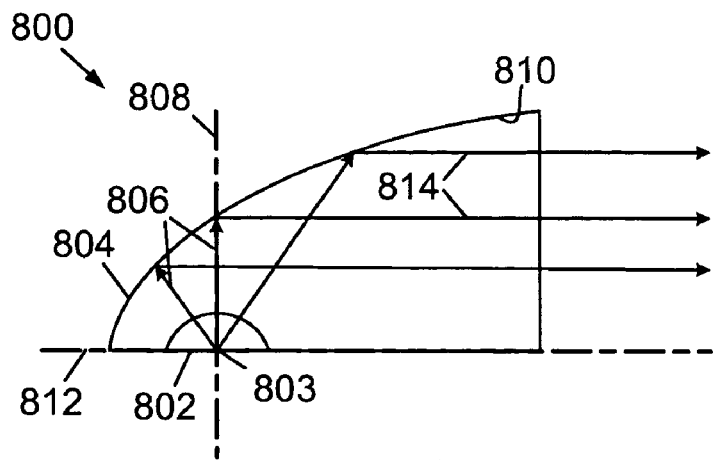
FIGS. 8A–8C show schematic cross-sectional views of embodiments of illumination units that include solid side reflectors according to principles of the present invention.

A cross-sectional view through an illumination unit 800 having a paraboloidal reflector 804 is schematically illustrated in FIG. 8A. The LED unit 802 directs light 806 to the reflecting surface 810. The LED unit 802 has an LED axis 808. The reflecting surface 810 has a shape that conforms to a paraboloid formed by rotating around the revolution axis 812. The light emitter area 803 is positioned close to, or at, a focus of the paraboloid, on the axis 812. In the illustrated embodiment, the LED axis 808 is perpendicular to the revolution axis 812, although this is not a necessary condition. The reflected light 814 is generally collimated and propagates somewhat parallel to the axis 812.

Figure 8B:
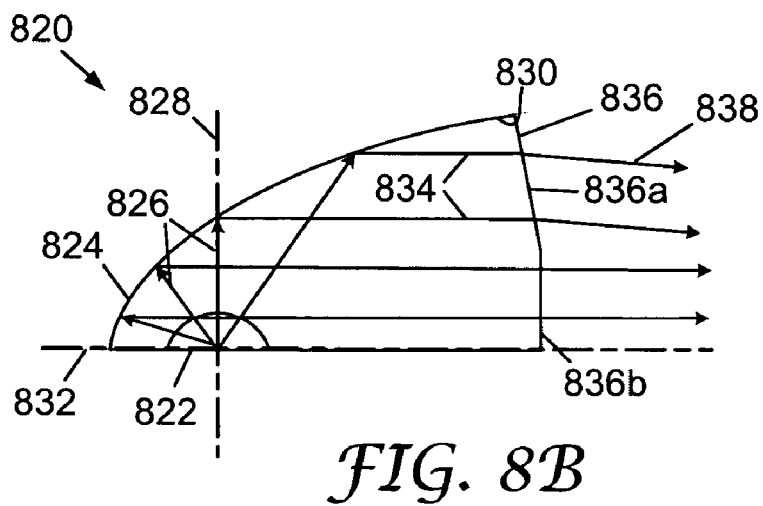
Figure 8C:
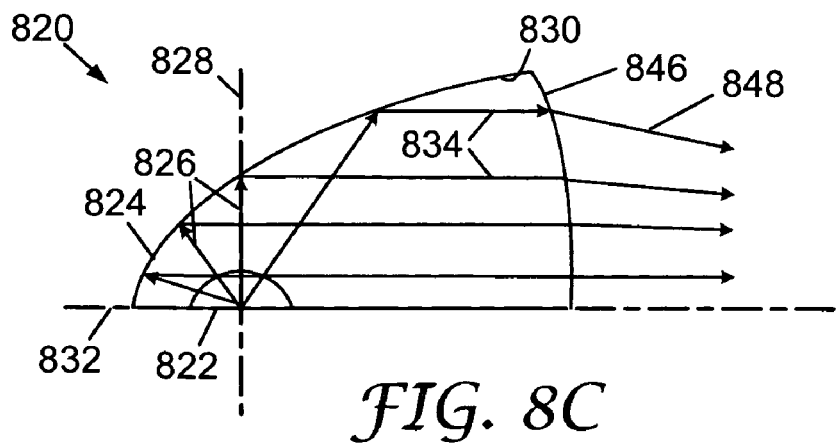

A paraboloidal reflector may be a hollow reflector or may be a solid body reflector. Two examples of solid body reflector are schematically illustrated in FIGS. 8B and 8C. In FIG. 8B, the illumination unit 820 includes a solid body reflector 824 that is illuminated by light 826 from an LED unit 822. The LED unit 822 has an LED axis 828 that is substantially perpendicular to the revolution axis 832. The light 834 reflected by the reflecting surface 830 propagates approximately parallel to the revolution axis. The solid body reflector 804 has an exit surface 836 which may be provided with different surface contours. In one embodiment, the exit surface 836 is flat and may perpendicular to the revolution axis. In the embodiment illustrated in FIG. 8B, the exit surface 836 has a number of different facets 836a, 836b that refract the light 838 upon exiting the reflector 824. The facets 836a, 836b direct light from different portions of the exit surface 836 in different directions. The facet 836a may, for example, direct light 838 to overlap with the light from facet 836b.

The exit surface may also be curved, for example as illustrated in FIG. 8C. Where the reflecting surface 830 is paraboloidal, the light 834 incident on the exit surface 846 somewhat collimated and parallel to the axis 832. The curved exit surface 846 may be used to converge the refracted light 848, as illustrated, or to diverge the refracted light 848. It will be appreciated that the exit surface 846 need not be curved over its entire area, and that the exit surface 846 may have a portion that is flat and a portion that is curved. Furthermore, different portions of the exit surface may be provided with different curves so that the different portions of the exit surface have different focusing powers.

Figure 9:
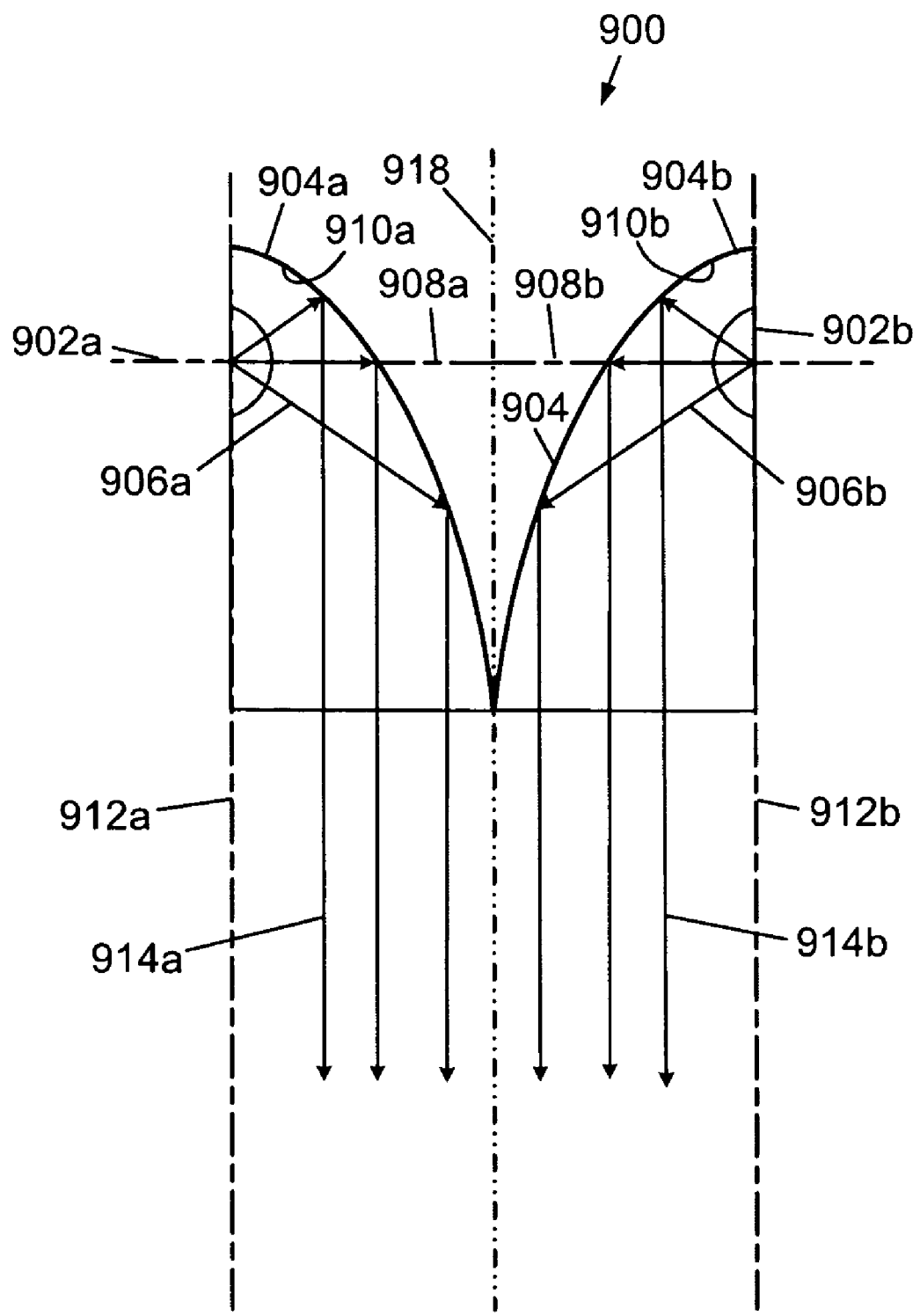
FIG. 9 schematically illustrates a cross-sectional view of an illumination unit that includes multiple side reflectors according to principles of the present invention.

An example of a multiple-reflector illumination unit 900 is schematically presented in cross-sectional view in FIG. 9. The illumination unit 900 has a reflector body 904 formed from two reflectors 904a and 904b with respective illumination LED units 902a and 902b. Each reflector 904a and 904b is formed with a reflecting surface 910a and 910b that conforms to a surface of revolution about its respective reflector revolution axis 912a and 912b. The respective LED units 902a and 902b transmit light 906a and 906b to the reflector 904a and 904b, which reflects the light 914a and 914b. The LED units 902a and 902b have respective LED axes 908a and 908b substantially perpendicular to their respective revolution axes 912a and 912b.

In the illustrated embodiment, the reflecting surfaces 910a and 910b are paraboloidal, so the reflected light 914a and 914b is substantially collimated and parallel to the respective axis 912a and 912b. In this particular embodiment, the axes 912a and 912b are also parallel to each other, so that the reflected light 914a is parallel to the reflected light 914b. The revolution axes 912a and 912b need not be parallel to teach other, however, and may be directed, for example, so that the light from each reflector 904a and 904b overlaps.

Another example of a multiple reflector illumination unit 1000 is now described with reference to FIG. 10A. The unit 1000 has a reflector 1004 that includes ten paraboloidal reflectors 1004a that substantially collimate the light from respective LED units 1002. The reflectors 1004a are arranged in a 5×2 regular array. In one particular embodiment, the reflector axes are parallel, so that the light from each reflector 1004a is somewhat collimated. The calculated illumination pattern from the illumination unit 1000 in the far field is shown in FIG. 10B. For this calculation, the separation between adjacent LED units 1002 is 10 mm and the far field pattern is calculated at 1 m. The radiation from each LED unit 1002 substantially overlaps in the far field to produce a spot having a 10° full cone angle (full angle, half maximum).

In another particular embodiment, discussed with reference to FIG. 10C, the reflector axes are not parallel, but are arranged so as to spread the light from each LED unit away from the light emitted from adjacent emitters. The calculated radiation pattern shows that a generally rectangular area 1010 is illuminated. Spots 1012 of relatively high intensity correspond to light from each of the reflectors 1004a. To calculate the radiation pattern illustrated in FIG. 10C, it was assumed that the revolution axis of each reflector was disposed at an angle of 10° from those of adjacent reflectors.

Figure 11B:
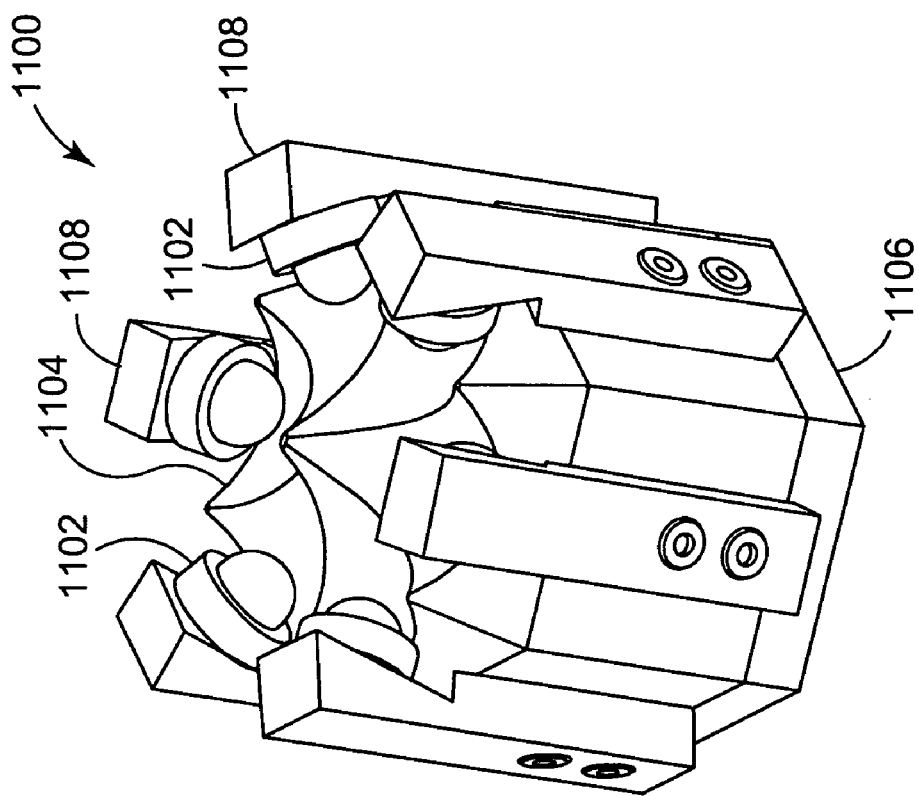
FIGS. 11A and 11B show schematic perspective views of experimental side reflector illumination units according to principles of the present invention.
Figure 11A:
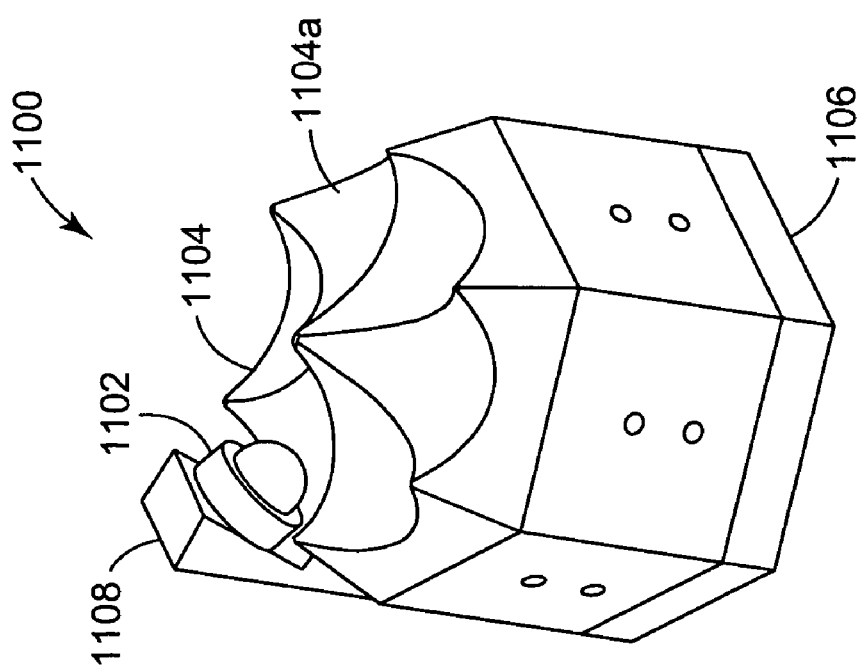

Perspective schematic views of one particular experimentally realized embodiment of a 6-reflector illumination unit 1100 are presented in FIGS. 11A and 11B. The reflector body 1104 includes six reflectors 1104a. The reflector body 1104 is formed on a reflector base 1106 and may be formed from metal, for example aluminum, or may be formed from a polymer, such as acrylic. The body may be formed to the correct shape using diamond turning, or may be molded if the body material is moldable. The reflector body 1104 may be coated with a reflective coating. For example, the reflector body 1104 may be coated with an aluminum or silver reflective coating. The reflective coating may be selected so as to preferentially reflect light in a desired wavelength band.

LED units 1102 are positioned next to their respective reflectors 1104a. Only one LED unit 1102 is shown in FIG. 1A, to allow the viewer to see the reflector body 1104. In FIG. 11B, all six LED units 1102 are shown mounted to the reflector base 1106 via LED mounting brackets 1108.

EXAMPLES

The illumination efficiency was calculated for different types of illumination unit to compare the efficacy of an illumination unit of the present invention compared to conventional illumination units. In all cases, the merit criteria included the collection of the maximum amount of light through an aperture 6.4 mm×6.4 mm inside an acceptance cone of ±21°. The numerical evaluation of the merit criteria is the geometrical collection efficiency (GCE), which is the ratio of light intensity through the specific aperture and within the specific acceptance cone compared to the total intensity emitted from the LED. The GCE is presented as normalized to the total light intensity emitted from one LED, even when analyzing multiple LED illumination units. Thus, where the GCE has a value of 300%, the GCE shows that the collected light efficiency is equal to three times the total light emitted by one LED. This figure of merit permits a consistent evaluation of different types of illumination units, and is independent of the number of LEDs used. In each case, the LED is assumed to have a radiation pattern like that shown in FIGS. 1B and 1C, and an emitting area 0.5 mm×0.5 mm.

Two types of light collector are analyzed in the examples provided below. The first is a reflective collector, in which the LED axis is parallel to the revolution axis, and the second is a reflective collector according to the present invention, with the LED axis non-parallel to the reflector axis.

Example 1

Reflective, On-Axis Collector

Figure 12A:
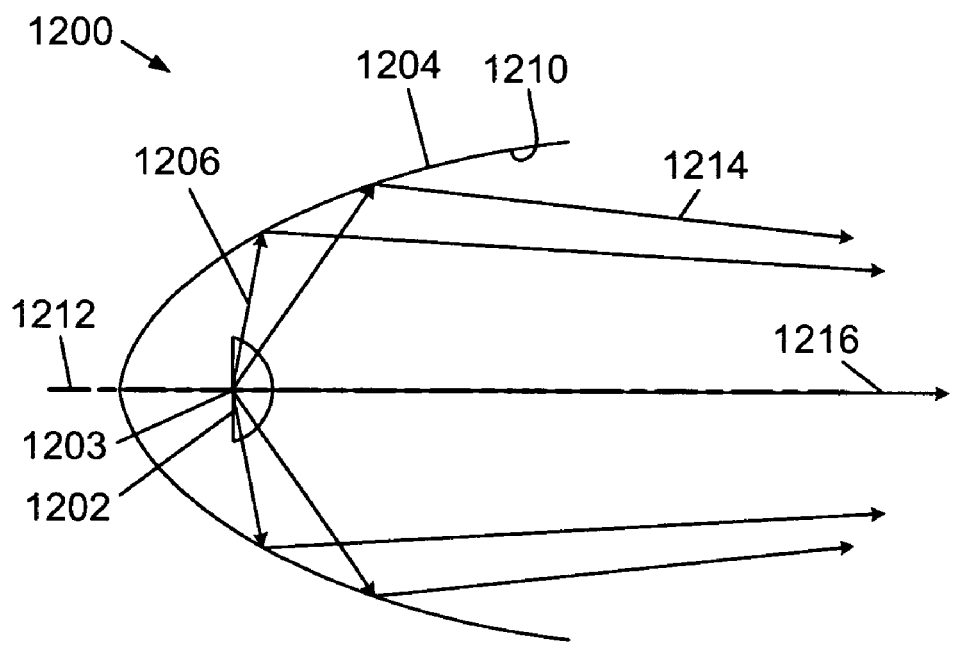
FIG. 12A schematically illustrates a cross-sectional view through a reflective, on-axis collector used in modeling collector efficiency.

A well-known approach to collecting light from an LED is to place an elliptical reflector around the LED, where the revolution axis is parallel to the LED axis, for example the illumination unit 1200 schematically illustrated in FIG. 12A. The LED unit 1202 is positioned with the LED emitter 1203 on the reflector axis 1212. The LED unit 1202 is aligned with its axis parallel and coincident with the revolution axis 1212. The LED unit 1206 emits light 1206 that is reflected to the target area as reflected light 1214, and also emits light 1216 that is directly incident on the target area. The reflector 1204 has a reflecting surface 1210 that is formed as an ellipsoid around the axis 1212. The emitter 1203 is positioned at the first focal point of the ellipsoid, so that the reflected light 1214 and directly incident light 1216 is collected at a point close to the second focal point of the ellipsoid.

Figure 12B:
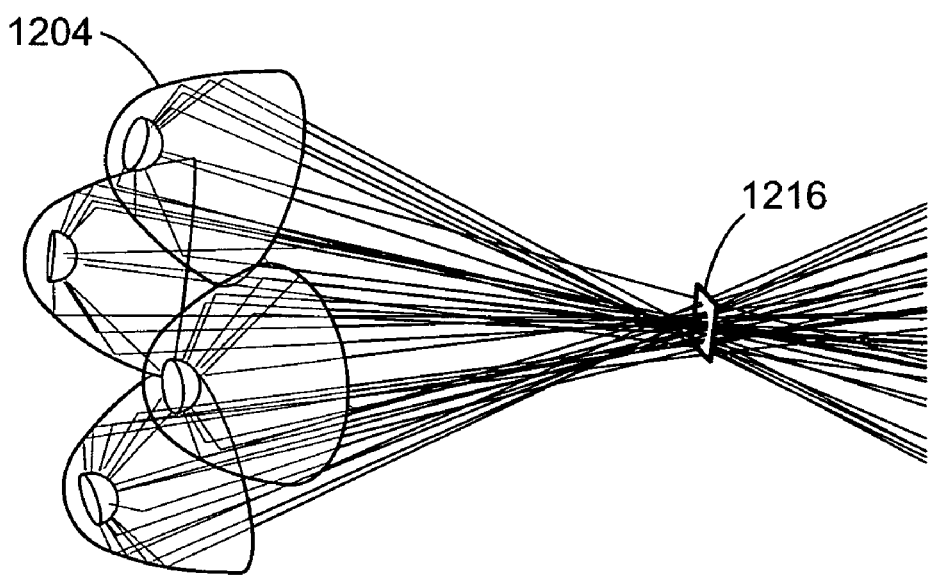
FIG. 12B schematically illustrates a light illumination unit having a reflective, on-axis light collector with four reflectors used in modeling collector efficiency.

The collection efficiency of such a system depends on the geometrical parameters of the ellipsoid and can be relatively high. For example, a single ellipsoid can have a collection efficiency of 81%. Four ellipsoidal reflector units like that shown in FIG. 12A can be assembled together as is schematically shown in FIG. 12B. The reflectors 1204, however, are relatively short in a dimension along the revolution axis so that adjacent reflectors 1204 can be placed in contact with each other, while still meeting the requirement of a ±21° cone incident at the target area 1216. The GCE of this arrangement is 130%. If portions of the reflectors 1204 are elongated along the revolution axis without interfering with adjacent reflectors 1204, the GCE of this illumination unit rises to about 160%.

Example 2

Side Reflector

A side reflector is one in which the revolution axis is not parallel to the LED axis, examples of which have been discussed with respect to the present invention in FIGS. 2–11. Where the reflectors have an ellipsoidal shape, the various embodiments of side reflector discussed have higher GCEs than for the on-axis reflective collector. The GCEs for side collectors have been calculated for collectors having different numbers of LED units, and where it was assumed in all cases that the LED axis was perpendicular to the revolution axis of the associated reflector. The results are listed in Table I, which also lists the values of GCE for the reflective, on-axis collector for comparison. The table also lists the number of the figure in which the particular embodiment is illustrated. In all cases, it was assumed that the LED units each had an emitting area of 500 µm×500 µm and had a half ball lens of radius 2.8 mm that was formed from PMMA.

TABLE I

Comparison of Geometrical Collection Efficiency for Various Collection Geometries

| Collector type | Illustrated in FIG. No. | No. of LEDs | GCE per LED | Total GCE |
|---|---|---|---|---|
| Reflective - on-axis | FIG. 12A | 1 | 81% | 81% |
| Reflective - on-axis | FIG. 12B | 4 | 40% | 160% |
| Side reflector | FIG. 2B | 1 | 80% | 80% |
| Side reflector | FIG. 6A | 4 | 64% | 256% |
| Side reflector | FIG. 4C | 6 | 52.7% | 316% |
| Side reflector | FIG. 6B | 8 | 49.3% | 394% |
| Side reflector | FIG. 6C | 16 | 35.8% (outer) 26.7% (inner) | 518% |

As can be seen from the table, although the reflective, on-axis collector is about as efficient as the side reflector when only one LED is used, the side reflector quickly gains an advantage when the number of LEDs is increased. For example, when four LEDs are used, the on-axis collector has a total GCE of about 160%, or about 40% per LED. In comparison, a side reflector with four LEDs has total GCE of about 256%, corresponding to about 64% per LED.

The side reflector also permits the illumination unit package to be made smaller than with an on-axis reflective approach. For example, for a single LED unit, the on-axis reflector fits in a package 35 mm×28 mm×28 mm, compared with a package size of 20 mm×11 mm×22 mm for the side collector.

Although the present description has concentrated mostly on ellipsoids and paraboloids, there is no restriction to using only these surfaces of revolution, and other types of surfaces of revolution may also be used. Furthermore, reflectors formed from these different surfaces of revolution may be hollow reflectors or may be solid reflectors.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. An illumination unit, comprising:
   a first curved reflector comprising a first reflecting surface that defines a first reflector axis; and
   a first light emitting diode (LED) positioned to emit light generally along an LED axis non-parallel to the first reflector axis, light from the first LED being reflectingly converged by the first reflecting surface towards a first target focus;
   wherein a first plane formed by the first reflector axis and the LED axis intersects the reflecting surface at an intersection region, the intersection region of the first reflecting surface extending closer towards the first focus than regions of the first reflecting surface outside the intersecting region.

2. A unit as recited in claim 1, wherein the first LED axis forms an angle to the first reflector axis of θ, where 45°≦θ≦90°, where θ is the minimum angle between the LED axis and the first reflector axis.

3. A unit as recited in claim 2, wherein 60°≦θ≦90°.

4. A unit as recited in claim 2, wherein the θ is approximately 90°.

5. A unit as recited in claim 1, wherein the first reflecting surface conforms to a first surface of revolution about the first reflector axis.

6. A unit as recited in claim 5, wherein the first reflecting surface conforms to an ellipsoid, the light emitting area of the first LED being positioned substantially at a first focus of the ellipsoid, the first target focus being positioned approximately at the second focus of the ellipsoid.

7. A unit as recited in claim 1, wherein the first reflector is formed of a transmitting medium with the reflecting surface defined on an outside surface of the transmitting medium, the transmitting medium being positioned between the first LED and the reflecting surface of the first reflector.

8. A unit as recited in claim 7, wherein the first reflector has a first exit aperture, the converging light from the first LED exiting through the first exit aperture, the transmitting medium having a substantially flat surface at the first exit aperture.

9. A unit as recited in claim 7, wherein the first reflector has a first exit aperture, the converging light from the first LED exiting through the first exit aperture, the transmitting medium having a faceted surface at the first exit aperture.

10. A unit as recited in claim 7, wherein the first reflector has a first exit aperture, the converging light from the first LED exiting through the first exit aperture, the transmitting medium having a curved surface at the first exit aperture.

11. A unit as recited in claim 7, wherein the transmitting medium has a concave surface forming a concavity for receiving the first LED, at least part of a lens of the first LED being located in the concavity.

12. A unit as recited in claim 11, further comprising an index matching material disposed between the first LED and the concave surface.

13. A unit as recited in claim 11, wherein the first LED is optically cemented to the concave surface.

14. A unit as recited in claim 1, wherein the first reflective surface is supported by a reflector support medium, the reflecting surface being disposed between the first LED and the reflector support medium.

15. A unit as recited in claim 1, further comprising at least a second reflector comprising a second reflecting surface that defines a second reflector axis non-parallel to the first reflector axis, and a second LED positioned to emit light generally non-parallel to the second reflector axis, light from the second LED being reflectingly converged by the second reflecting surface.

16. A unit as recited in claim 15, wherein the first and second reflector axes intersect approximately at the first target focus.

17. An illumination unit, comprising:
a reflector body having a body axis, the reflector body comprising
a first reflecting surface having a first axis and a first focus, the first reflecting surface having a shape such that light from the first focus is convergingly reflected by first reflecting surface; and
a second reflecting surface disposed adjacent to the first reflecting surface, the second reflecting surface having a second axis a second focus, the second reflecting surface being shaped such that light from the second focus is convergingly reflected by the second reflecting surface;
wherein the first and second reflecting surfaces are positioned transversally about the body axis and the second axis is non-parallel with the first axis so that light from the first focus that is convergingly reflected by the first reflecting surface overlaps with light from the second focus that is convergingly reflected by the second reflecting surface.

18. A unit as recited in claim 17, further comprising a first light emitting diode (LED) positioned proximate the first axis and disposed to emit light generally in a direction transverse to the first axis towards the first reflecting surface, and a second LED positioned proximate the second axis and disposed to emit light generally in a direction transverse to the second axis towards the second reflecting surface.

19. A unit as recited in claim 18, wherein the first and second LEDs are positioned approximately at the first and second foci respectively.

20. A unit as recited in claim 17, wherein the first and second axes are both nonparallel to the body axis.

21. A unit as recited in claim 20, wherein the first and second axes intersect the body axis at an intersection point.

22. A unit as recited in claim 17, wherein the first and second reflecting surfaces each conform to surfaces of revolution about the first and second axes respectively.

23. A unit as recited in claim 22, wherein the first and second surfaces of revolution are ellipsoids.

24. A unit as recited in claim 23, wherein the first and second ellipsoidal surfaces have major axes of substantially the same length and minor axes of substantially the same length.

25. A unit as recited in claim 17, wherein the first and second reflecting surfaces each define respective secondary foci.

26. A unit as recited in claim 25, wherein the secondary foci of the first and second reflecting surfaces are approximately collocated on the body axis.

27. A unit as recited in claim 17, further comprising at least a third reflecting surface disposed adjacent the first and second reflecting surfaces, the at least a third reflecting surface having a third axis and a third focus the first, second and at least a third reflecting surfaces being positioned transversally about the body axis, the third reflecting surface defining a third focus and being shaped such that light from the third focus is convergingly reflected by the third reflecting surface.

28. A unit as recited in claim 27, wherein the first, second and third axes are non-parallel to the body axis.

29. A unit as recited in claim 28, wherein the first, second and third axes intersect the body axis substantially at a single intersection point.

30. A unit as recited in claim 27, wherein the first, second and at least a third reflecting surface comprise at least four reflecting surfaces disposed symmetrically about the body axis.

31. A unit as recited in claim 27, wherein the first, second and at least a third reflecting surfaces are aligned to illuminate a common target area corresponding to respective secondary foci of each of the first, second and at least third reflective surfaces when the first, second and third reflecting surfaces are illuminated with respective first, second and third light emitting diodes (LEDs) positioned close to the first, second and third foci of the first, second and third reflecting surfaces.

32. A unit as recited in claim 27, wherein the first, second and at least a third reflecting surfaces form an enclosed shape having an aperture therethrough, the aperture lying on the body axis, and further comprising at least a fourth reflecting surface conforming to at least a fourth surface of revolution about at least a fourth revolution axis disposed to reflect light through the aperture.

33. A unit as recited in claim 17, wherein the first and second reflecting surfaces each comprise a multilayer optical film.

34. A unit as recited in claim 17, wherein the first and second reflecting surfaces define reflecting surfaces for respective hollow reflectors.

35. A unit as recited in claim 17, wherein the first and second reflecting surfaces define reflecting surfaces far respective solid body reflectors.

36. A unit as recited in claim 17, wherein at least one of the solid body reflectors has a faceted exit surface.

37. A unit as recited in claim 17, wherein at least one of the solid body reflectors has a flat exit surface.

38. A unit as recited in claim 17, wherein at least one of the solid body reflectors has a curved exit surface.

39. A device for producing a beam of light, comprising:
a reflective module comprising a first reflecting surface, the first reflecting surface having a first reflector axis and a first reflector focus and also comprises at least a second reflecting surface having a second reflector axis and a second reflector focus;
a first light emitting diode (LED) positioned approximately at the first reflector focus and directing light along a first LED axis, generally transverse to the first reflector axis, towards the first reflecting surface, light from the first LED incident on the first reflecting surface being converged by the reflective module to a target focus located outside the reflective module; and
a second LED being positioned approximately at the second reflector focus and directing light towards the second reflecting surface.

40. A unit as recited in claim 39, wherein the first LED axis forms an angle to the first reflector axis of $\theta$, where $45° \leq \theta \leq 90°$, where $\theta$ is the minimum angle between the first LED axis and the first reflector axis.

41. A unit as recited in claim 40, wherein $60° \leq \theta \leq 90°$.

42. A unit as recited in claim 40, wherein $\theta$ is approximately 90°.

43. A unit as recited in claim 39, wherein the first reflecting surface conforms to a first surface of revolution about the first axis.

44. A unit as recited in claim 43, wherein the first reflecting surface conforms to an ellipsoid having first and second foci, the first LED having a light emitting area positioned substantially at the first focus of the ellipsoid, and the first target focus is positioned approximately at the second focus of the ellipsoid.

45. A unit as recited in claim 39, wherein the reflective module comprises a transmitting medium with the reflecting surface disposed outside the transmitting medium, the transmitting medium being positioned between the first LED and the reflecting surface.

46. A unit as recited in claim 45, wherein light from the first LED exits the reflective module through a first exit aperture and the transmitting medium has a substantially flat surface at the first exit aperture.

47. A unit as recited in claim 45, wherein light from the first LED exits the reflective module through a first exit aperture and the transmitting medium has a faceted surface at the first exit aperture.

48. A unit as recited in claim 45, wherein light from the first LED exits the reflective module through a first exit aperture and the transmitting medium has a curved surface at the first exit aperture.

49. A unit as recited in claim 45, wherein the transmitting medium has a concave surface forming a concavity for receiving the first LED, at least part of a lens of the first LED being located in the concavity.

50. A unit as recited in claim 39, wherein the first reflector is formed with the reflecting surface disposed between the first LED unit and a reflector support medium.

51. A unit as recited in claim 39, wherein light from the second LED incident on the second reflecting surface is converged to the target focus.

52. A unit as recited in claim 39, wherein the light from the second LED is reflectingly converged to the target focus by the second reflecting surface.

53. A unit as recited in claim 39, wherein the first and second reflector axes are non-parallel.

54. A unit as recited in claim 53, wherein the first and second reflector axes approximately intersect at the first target focus.

55. A unit as recited in claim 17, wherein the first and second axes, each form acute angles with the body axis.

56. A unit as recited in claim 17, wherein the first and second axes are tilted relative to the body axis, with the first and second reflecting surfaces between the body axis and the first and second axes respectively.

* * * * *

UNITED STATES PATENT AND TRADEMARK OFFICE
CERTIFICATE OF CORRECTION

PATENT NO. : 7,070,301 B2
APPLICATION NO. : 10/701201
DATED : July 4, 2006
INVENTOR(S) : Simon Magarill It is certified that error appears in the above-identified patent and that said Letters Patent is hereby corrected as shown below:

Title Page
Col. 2, line 5 (U.S. PATENT DOCUMENTS), delete "NIshihara" and insert -- Nishihara --, therefor.

Title Page 2
Col. 1, line 21 (U.S. PATENT DOCUMENTS), delete "Tio et al." and insert -- Tiao et al. --, therefor.

Col. 1, line 22 (U.S. PATENT DOCUMENTS), delete "6,300,039" and insert -- 6,330,039 --, therefor.

Col. 1, line 34 (U.S. PATENT DOCUMENTS), delete "Serizawa" and insert -- Serizawa et al. --, therefor.

Col. 2, line 6 (OTHER PUBLICATIONS), delete "p." and insert -- pp. --, therefor.

Title Page 3
Col. 1, line 7 (OTHER PUBLICATIONS), delete "Inc," and insert -- Inc., --, therefor.

Column 2
Line 13, delete "6B" and insert -- 6C --, therefor.

Column 5
Line 12, delete "90°," and insert --90°.--, therefor.

UNITED STATES PATENT AND TRADEMARK OFFICE
CERTIFICATE OF CORRECTION

PATENT NO. : 7,070,301 B2
APPLICATION NO. : 10/701201
DATED : July 4, 2006
INVENTOR(S) : Simon Magarill It is certified that error appears in the above-identified patent and that said Letters Patent is hereby corrected as shown below:

Column 8
Line 54, delete "1A," and insert -- 11A, --, therefor.

Column 12
Line 25, in Claim 20, delete "nonparallel" and insert -- non–parallel --, therefor.

Signed and Sealed this

Twenty-third Day of January, 2007

JON W. DUDAS
*Director of the United States Patent and Trademark Office*